Dec. 16, 1952    L. G. KOPP    2,621,466
SIDE DELIVERY RAKE
Filed April 26, 1949    5 Sheets-Sheet 1

INVENTOR.
LESTER G. KOPP
BY H. M. Alexander
& E. Jherlich
ATTORNEYS

Dec. 16, 1952 L. G. KOPP 2,621,466
SIDE DELIVERY RAKE
Filed April 26, 1949 5 Sheets-Sheet 2

INVENTOR.
LESTER G. KOPP
BY W. M. Alexander
& E. J. Nerlich
ATTORNEYS

Dec. 16, 1952 L. G. KOPP 2,621,466
SIDE DELIVERY RAKE
Filed April 26, 1949 5 Sheets-Sheet 3
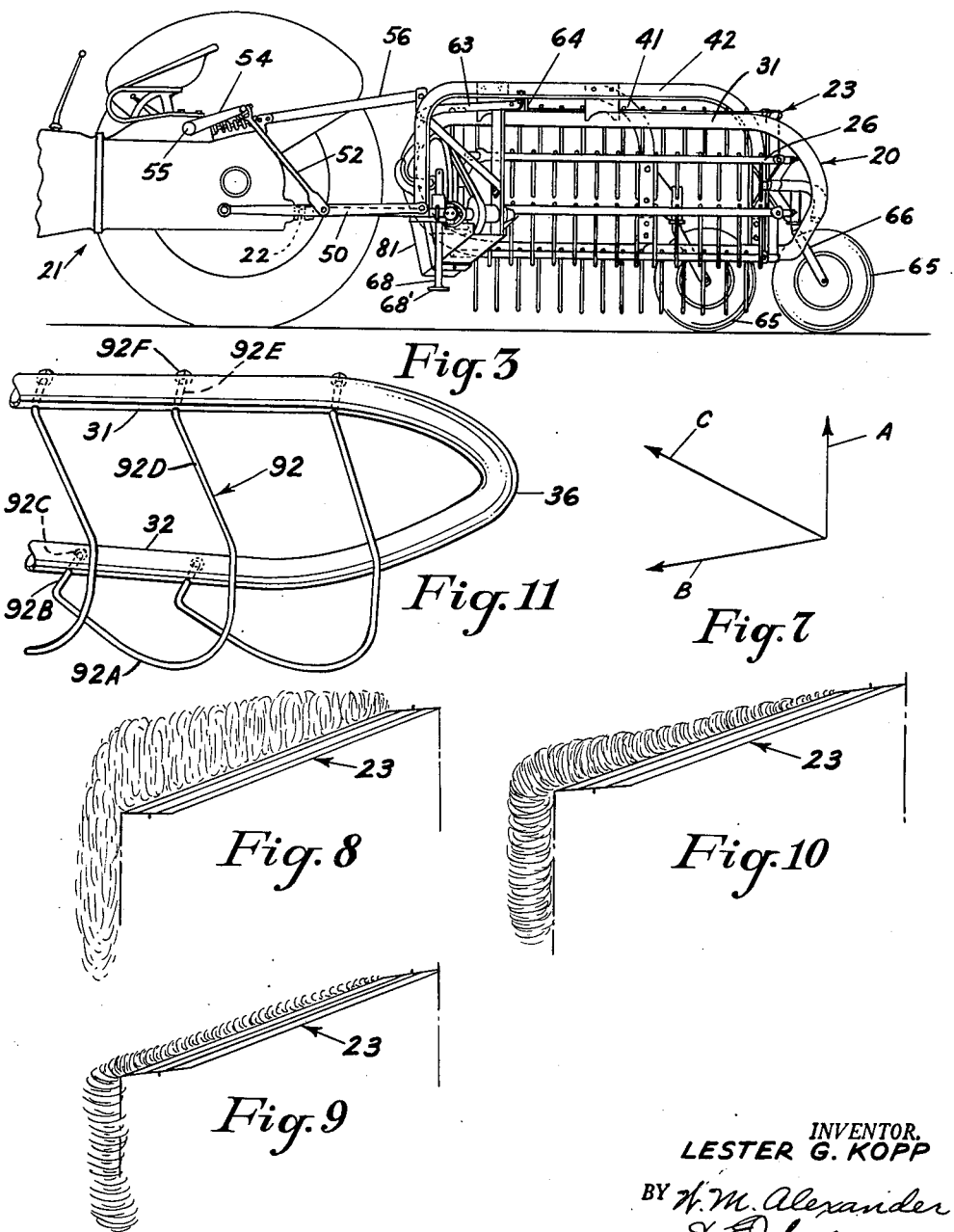
INVENTOR.
LESTER G. KOPP
BY W. M. Alexander
& E. Osterlick
ATTORNEYS

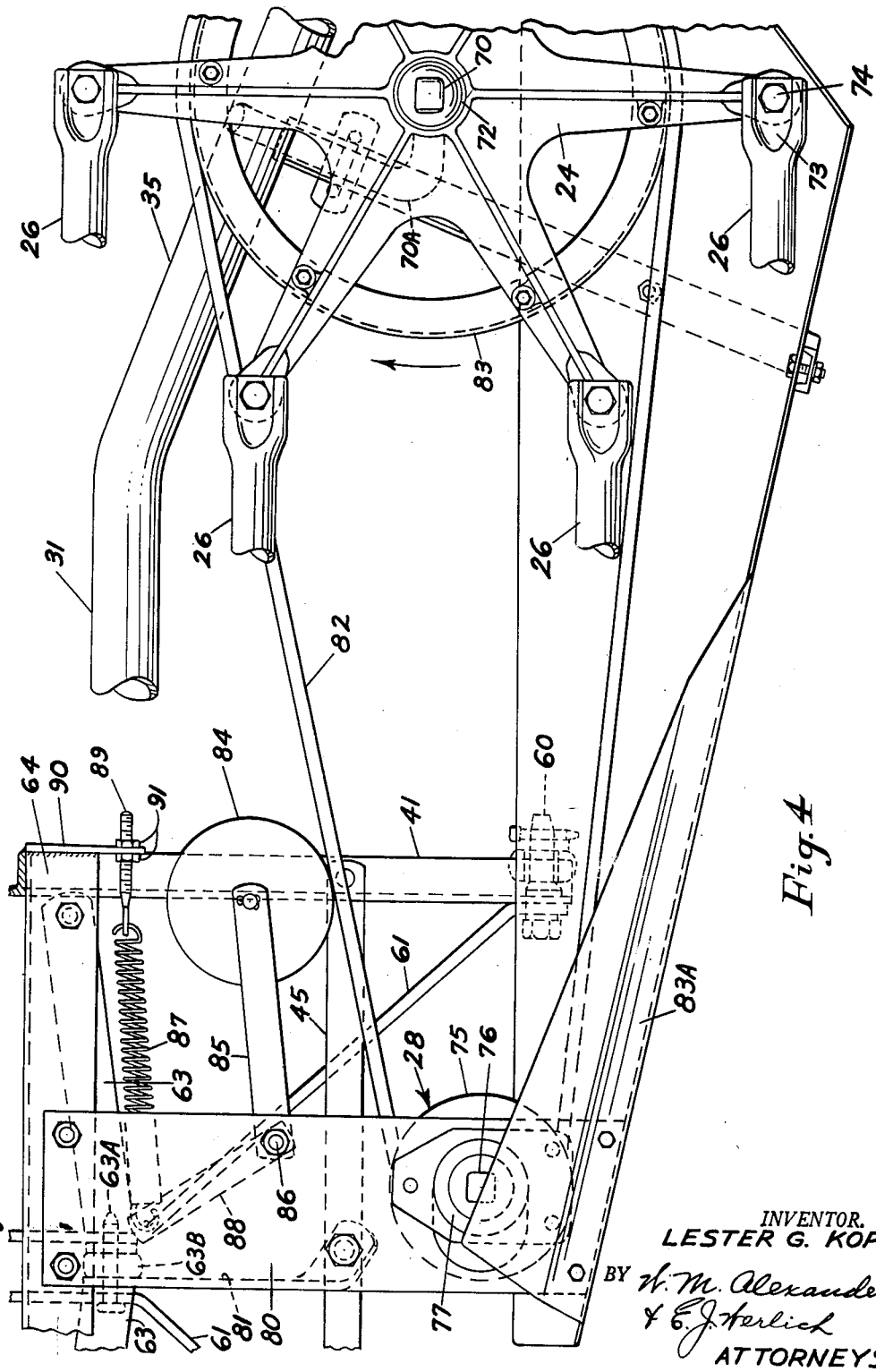

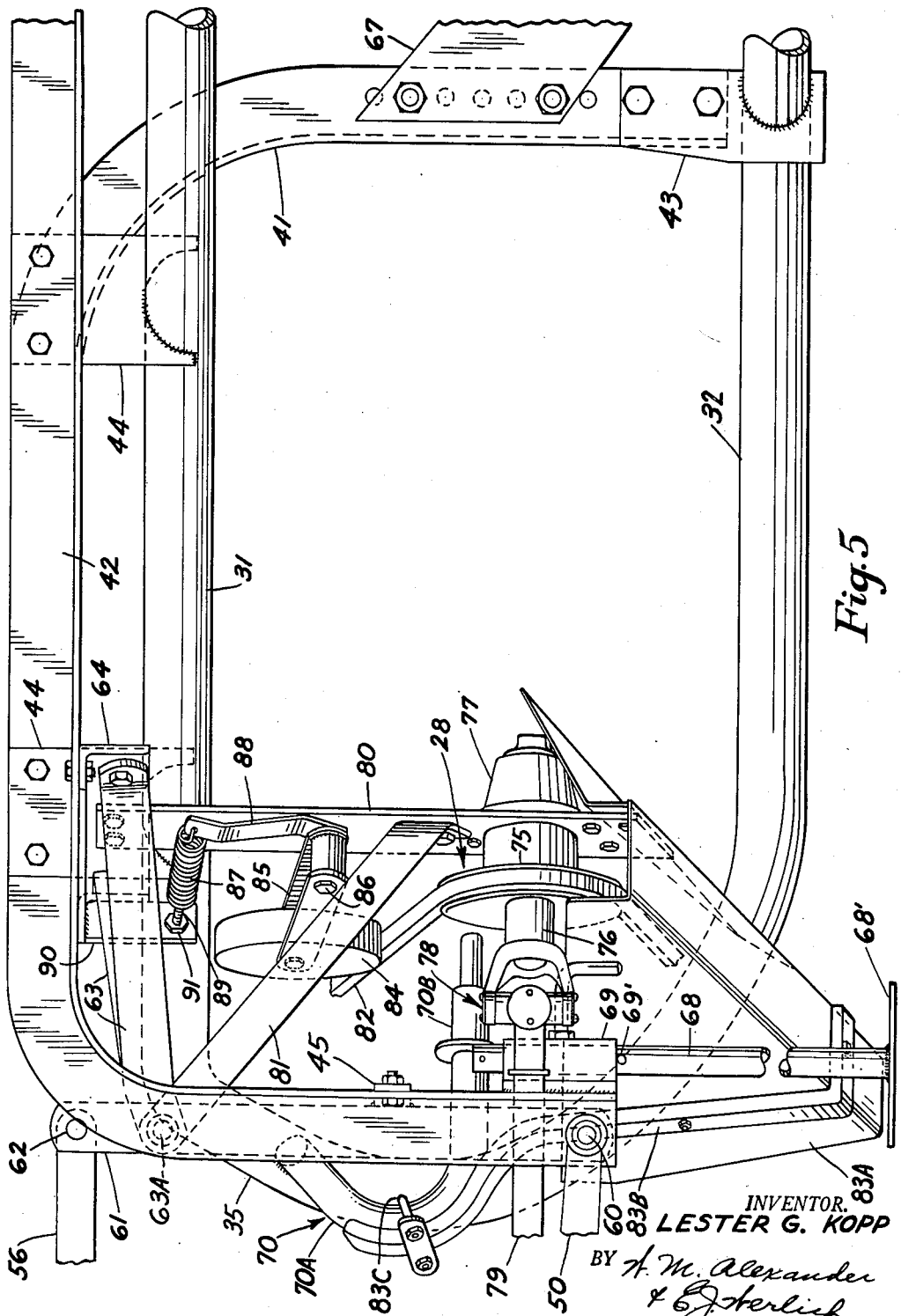

Patented Dec. 16, 1952

2,621,466

UNITED STATES PATENT OFFICE 2,621,466

SIDE DELIVERY RAKE

Lester G. Kopp, Leavenworth, Kans., assignor to Harry Ferguson, Inc., Detroit, Mich., a corporation of Delaware Application April 26, 1949, Serial No. 89,583

13 Claims. (Cl. 56—377)

This invention relates to a side-delivery rake and more particularly to a side-delivery rake in which rake bars extend obliquely between non-aligned end members. The rake is adapted to be drawn by a tractor and may be at least partially mounted on the tractor.

Hay rakes of the above general character, although theoretically presenting substantial advantages over rakes of the conventional type have never come into extensive use. The principal reason for this is that when operated at a practical ground speed, such rakes as heretofore constructed either pack the hay too tightly in the windrow for proper curing or tend to stretch and twist it into a rope-like mass that makes subsequent handling extremely difficult. Certain of the undesirable operating characteristics can be reduced to some extent by operating the implement at a lower ground speed, but this only magnifies other objectionable characteristics, and moreover, the capacity of the rake is reduced to such an extent that its use becomes uneconomical.

With the above in view, the primary object of the invention is to provide an improved side-delivery rake in which roping, packing and other objectionable characteristics have been completely eliminated and which is capable of cleanly raking and windrowing the hay from a maximum area of ground in a given time interval with minimum stalk breakage and without excessive compression or "roping" of the hay in the windrow.

Another object is to make improvements in a side-delivery rake of the type having misaligned end members and rake bars extending obliquely between the end members and in the means for connecting such a rake to a tractor.

A further object is to operate a side-delivery rake having misaligned reel members with axes canted to the line of travel of the rake in such a way that use is made of the rearward component of movement of the rake teeth due to the canted axes of the reel members for producing an improved raking action.

Other objects and advantages of the invention will become apparent from the following detailed description of the preferred embodiments illustrated in the accompanying drawings, in which:

Fig. 3 is a side elevation of the rake.

Fig. 4 is a sectional view on an enlarged scale taken in a plane substantially on the line 4—4 of Fig. 1.

Fig. 5 is a sectional view on an enlarged scale taken in a plane substantially on the line 5—5 of Fig. 1.

Fig. 7 is a diagram showing relative velocities of the rake, the individual rake teeth, and the hay gathered by the teeth.

Figs. 8 and 9 are schematic views showing the manner in which conventional side-delivery rakes cause roping or packing of the hay deposited in the windrows.

Fig. 10 is a schematic view showing the manner in which hay is deposited in the windrow by a rake constructed in accordance with the present invention.

Fig. 11 is a perspective view on an enlarged scale of a part of the rake frame and stripper members.

Figure 1:
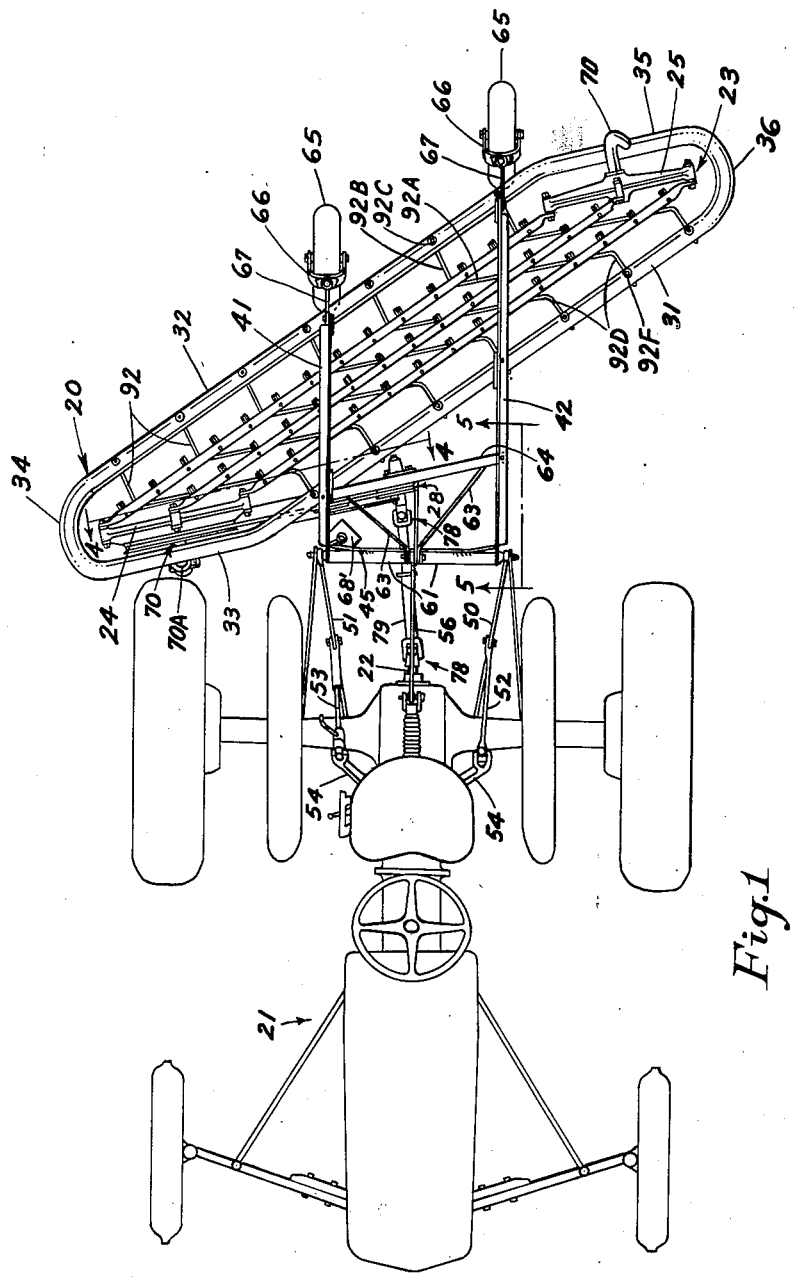
Figure 1 is a plan view of a side delivery rake embodying the features of the invention, the rake being shown operatively coupled to a tractor.

While the invention is susceptible of various modifications and alternative constructions, a certain preferred embodiment has been shown in the drawings and will be described in detail herein, but it is to be understood that there is no intention to limit the invention to the specific form disclosed, but, on the contrary, the intention is to cover all modifications and alternative constructions falling within the spirit and scope of the invention as expressed in the appended claims.

Figure 2:
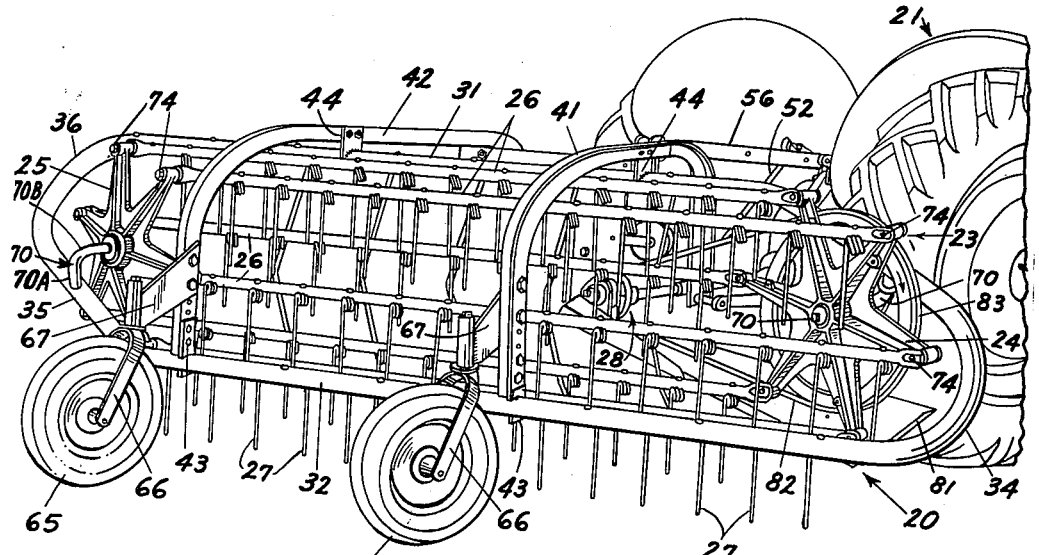
Fig. 2 is a rear elevational view on an enlarged scale of the rake.

Referring now to Figs. 1–3 of the drawings, the rake selected to illustrate the invention has an elongated frame structure 20 adapted to be connected in trailing relation to a towing vehicle 21, such as a tractor having a power take-off shaft 22. The frame supports a rake reel 23 comprising a pair of rotatably mounted end members or spiders 24 and 25 between which are connected a series of rake bars 26 which have a plurality of depending tines or spring teeth 27. The axes of the reel end members 23 and 24 are laterally displaced from one another so that the rake bars 26 extend at an acute angle to planes perpendicular to the axes of the reel end members. The reel is spaced from the ground so that upon rotation the teeth 27 of the bars 26 traversing the lower portion of their circular path sweep the ground and are thus effective to gather and carry along any loose hay stalks encountered. Power for rotating the reel 23 is obtained from the shaft 22 and applied through a transmission 28 carried on the frame 20.

As will be seen by reference to Fig. 1 of the drawings, the frame 20 is arranged diagonally with respect to the axis of the towing vehicle; that is, the frame extends at other than a right angle to the path along which the rake is towed by the vehicle 21. The spiders 24 and 25 are supported at opposite ends of the frame 20 so that the axis of the reel extends correspondingly diagonally. This diagonal angle of the reel enables it to impart a lateral component of motion to the rake teeth 27, which is essential to the delivery of the hay at the side of the rake.

Before proceeding with a detailed description of the exemplary rake, it will be helpful to discuss briefly some of the more important considerations involved in the design of a side-delivery rake capable of performing its intended functions in an acceptable manner. The ultimate factor determinative of the raking action of the implement is, of course, the velocity and direction of travel of the rake teeth relative to the ground. These are the resultant of the movements imparted to the rake teeth by rotation of the reel 23 and the movements imparted thereto by the forward travel of the implement. The rate of forward movement is dependent upon the type of towing vehicle employed, as it is desirable to operate the latter at or near its normal and most efficient ground speed.

My initial studies indicated that a rake-tooth velocity relative to the implement substantially equal to the implement velocity is theoretically the best. In practice, however, that velocity ratio does not produce the desired result, but instead tends to pile up an excessive amount of hay ahead of the rake, as shown in Fig. 8, and to discharge it into the windrow twisted and ropelike. I have observed that the reason for this is the "slip" or compressibility factor of the hay. Thus, as the collected mass of hay is moved along by a set of rake teeth, it is compressed a substantial amount and when the pressure of the operative rake teeth is removed the mass tends to expand back to its normal volume. Successive sets of rake teeth add additional hay to this mass until its cross-sectional area is substantially greater than that of the windrow. The passage of this hay into the windrow then takes place with a pulling and twisting action which produces the undesired "roping" effect as illustrated in Fig. 8 of the drawings.

It was thought at first that this difficulty might be corrected by simply speeding up the rake reel to impart a higher velocity to the rake teeth. Experience has shown, however, that speeding up the reel alone does not effectually solve the problem. For one thing, a definite limit is imposed on tooth velocity by the tendency of the teeth to break or tear the raked stalks when operated at too high a velocity relative to the ground. Moreover, with high tooth velocity relative to the implement, the hay is swept laterally into the windrow by the rake teeth at too high a speed, resulting in objectionably tight packing in the windrow. The action of the rake when operated in that manner is illustrated in Fig. 9 of the drawings.

I have found that the above difficulties can be overcome by a novel construction and mode of operation which takes into consideration the various factors herein referred to, thereby producing a rake of large productive capacity capable of windrowing the hay untwisted and at precisely the right density for curing. For this purpose the rake reel 23 is constructed so that a small rearward component of motion relative to the implement is imparted to the rake teeth 27 upon rotation of the reel and the latter is rotated at a speed effective to compensate for the compressibility factor above discussed and to move the gathered hay along the ground at a velocity properly coordinated with the forward velocity of the implement.

In operation, the speed ratio is adjusted so that the path traversed by the hay relative to the ground is disposed at a substantial angle with respect to the line of travel of the implement, as indicated in the diagram Fig. 7, in which the vector A represents the direction and velocity of the implement, vector B the direction and velocity of the rake teeth relative to the implement, and vector C the resultant direction and velocity of the rake teeth relative to the ground. With this arrangement, the gathered hay is pushed along ahead of the implement in a loose fluffy mass which tapers uniformly toward the delivery side of the rake at which point it attains substantially the same cross-sectional area as the windrow (see Fig. 10). This mass then merely turns a corner in passing from the rake into the windrow. In other words, the cross-sectional area of the collected mass of hay is substantially unchanged or increases only slightly during the time in which it moves from in front of the outer or discharge end of the rake reel into the windrow. The hay is thus delivered into the windrow without pulling or roping and without excessive packing.

The rearward tooth movement relative to the implement is obtained by canting the axes of the reel end members 24 and 25 at an angle to the line of travel of the implement. It will be understood of course that the spider axes are maintained in parallel relation so that they may rotate freely while interconnected by the rake bars 26. Taking into consideration all of the diverse factors involved, it has been found that the best results are obtained with the spider axes inclined toward the delivery side of the rake at an angle of approximately 10° from the line of travel of the implement. With the implement frame 20 inclined at an angle of approximately 35° to the line of travel, this permits the rake bars 26 to be mounted on the spiders 24 and 25 with a clearance angle therebetween of about 25°.

Figure 6:
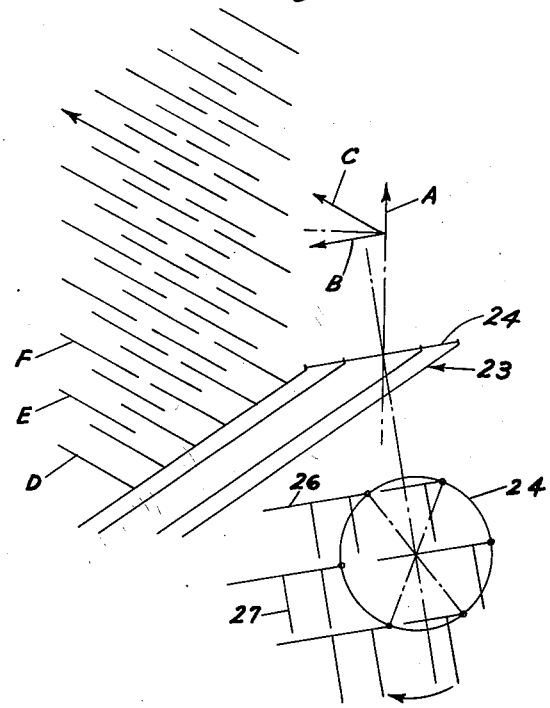
Fig. 6 is a diagram showing the relative velocities of direction of movements of the rake and of the individual rake teeth.

The action of the rake teeth 27 under the above conditions is illustrated by the velocity diagram Fig. 6. In this diagram, as in Fig. 7, the vector A represents the direction and velocity of the implement and the vector B represents the direction and velocity of the rake teeth relative to the implement. The resultant direction and velocity of the rake teeth relative to the ground is represented by the vector C. The broken line vector between the vectors B and C represents the width of the area to be raked, usually referred to as the swath. Thus, as the reel 23 rotates and advances with the implement, the teeth 27 of the several rake bars 26 sweep successive paths D, E, F, etc. along the ground and act to carry the gathered hay along in a path inclined at an angle of approximately 60° to the line of travel of the implement. It has been found that with the aforementioned angles, the resultant tooth path represented by the vector C exceeds the width of the swath by no more than ten percent when the rake reel and tractor speeds are kept within the ratios discussed hereinafter.

Turning now to the exemplary rake structure and referring more particularly to Figs. 1 and 2 of the drawings, the frame 20 comprises front and rear side portions 31 and 32, extending diagonally with respect to the line of travel and connected at their front ends by a short straight end portion 33 and a curved portion 34. A similar straight end portion 35 and a curved portion 36 connect the rear ends of the side portions 31 and 32. The various portions of the frame 20 are preferably constructed of tubular stock, thus providing strength and rigidity with minimum weight. The end portions 33 and 35 of the frame extend at a small angle to a direction transverse of the line of travel, generally parallel to the planes of the reel end members 24 and 25, which are also at an angle to the transverse, since the axes of the end members are canted to the line of travel.

The frame 20 is positioned so that the front side portion 31 is at a higher level than the rear side portion 32. The frame 20 is held in this position by spaced members 41 and 42, which extend diagonally across frame portions 31 and 32, and in this instance are generally parallel to the line of travel. Each of the members 41 and 42 has a depending rear end portion bolted or otherwise attached to a bracket 43 welded to the rear side portion 32. Intermediate portions of the members 41 and 42 extend over the frame 20 and carry brackets 44 secured to the front side portions 31 of the frame.

The members 41 and 42 have depending front end portions forward of the frame 20, and these front end portions are connected by a cross brace 45 and are equipped for connection with the towing vehicle. The towing vehicle 21 illustrated will be recognized as a conventional lightweight tractor having a Ferguson system hitch linkage. This linkage includes a lower pair of laterally spaced draft links 50 and 51 pivoted at their forward ends beneath the rear axle of the tractor. The draft links are suspended by drop links 52 and 53 from cranks 54 rigid with a rockshaft 55 (Fig. 3) journaled on the tractor body. The latter is oscillated by a hydraulic ram (not shown) as is customary in the Ferguson system. Also constituting a part of the linkage and serving in well known manner to control the operation of the hydraulic ram is a top or compression link 56 extending rearwardly from the tractor body above and substantially midway between the draft links 50 and 51.

For connection with the draft links 50 and 51 the forward end portions of the members 41 and 42 are provided with outwardly facing studs 60 (Figs. 3 and 4) for reception of the trailing ends of the draft links. Connection with the compression link 56 is effected by a pair of bars 61 anchored to the transverse members 41 and 42 adjacent the respective studs 60, as shown in Fig. 4. These bars extend upwardly and inwardly to abut opposite sides of the link 56 and are connected thereto by a pin 62. Diagonal braces 63 extending between the upper ends of the bars 61 and a cross member 64 connected to the intermediate portions of the members 41 and 42 serve to hold the bars rigid with the frame. A pin 63A joins the bars 61 and the braces 63 with a spacer 63B and a brace 81 between them. The purpose of the brace 81 will be described presently. The cross brace 45 is welded to the bars 61.

The connection provided by the above construction and arrangement of parts is sufficiently flexible to allow the implement to conform to irregularities in ground contour yet effective to maintain it properly alined with the tractor at all times. Moreover, it permits swinging of the implement to a raised or transport position by the action of the hitch linkage without imposing excessive strains on any part of the implement. More particularly, the lifting forces are applied through the transverse members 41 and 42 which normally support the weight of the implement when it is in use.

The frame members 41 and 42 also carry ground-engaging elements for supporting the rake structure in spaced relation to the ground for proper operation of the rake teeth. The ground-engaging elements may be of any preferred construction and, as herein shown, comprise rubber-tired wheels 65 each journaled in a fork 66 swivel-mounted on a bracket 67 projecting rearwardly from the depending portion of the associated frame member. The wheels are thus enabled to follow the turning movements of the implement.

Provision is also made for supporting the front end of the implement when it is disconnected from the towing vehicle. This supporting means, as shown in Figs. 3 and 5, comprises an upright post 68 having a ground-engaging plate or foot 68' at its lower end. The post is slidably supported for vertical movement in a socket member 69 carried at the lower end of one of the members 41 and 42, in this instance the member 41. By sliding the post up or down it may be retracted to an out-of-the-way position, as shown in Fig. 3, when the implement is used, or it may be shifted so as to bring the foot 68' into ground-engaging position, as shown in Fig. 5. Any suitable means such as a pin 69' may be utilized for locking the bar 68 in operative position.

As indicated heretofore, the frame 20 provides support for the rake reel 23. Support is provided in this instance by a pair of spindles 70 secured to the frame end portions 33 and 35. As herein shown, each spindle is formed of angularly related portions 70A and 70B. The rear spindle 70, being connected to the rear end portion 35 of the frame 20 nearer the lower side portion 32 than the upper side portion 31, extends upwardly to provide support for the rear spider 25. Conversely, the front spindle 70, being nearer the upper side portion 31, extends downwardly from the front end portion 33. It will be understood, of course, that the spindles are positioned so as to locate the spider axes at a small angle to the line of travel of the implement, as explained heretofore.

The clearance angle provided by the construction and arrangement of the parts above described permits the use of six of the rake bars 26 in the rake reel, instead of the customary four, with a corresponding increase in the efficiency of the rake. The spiders 24 and 25 are accordingly formed with six arms extending radially from a central hub portion 72. The rake bars 26 are suitably connected to the arms adjacent their outer ends.

Preferably the rake bars 26 comprise lightweight tubular elements upon which the spring teeth 27 are mounted at spaced points. The ends of the bars are flattened, as at 73 (Fig. 4) providing sockets for headed pins 74 carried by the spider arms. The arrangement is such that the bars are carried in a circular path in the rotation of the spiders, but do not turn upon their longitudinal axes, because the bars 27 extend from the reel end members 23 and 24 at an acute angle, sufficiently less than a right angle, to planes perpendicular to axes of the reel end members 23 and 24. The rake teeth 27 are therefore presented in depending relation at all times and in position to sweep the ground as the associated bar traverses the lower part of its circular path.

In accordance with the invention, the rake reel 23 is driven from the power take-off shaft 22 of the tractor through the transmission 28. The transmission as herein shown comprises a pulley or sheave 75 (Figs. 4 and 5) rotatably supported on a shaft 76 journaled in a housing 77 which encloses a ratchet or similar overdrive connecting the shaft in driving relation to the sheave 75. The shaft 76 is drivingly connected through a pair of universal joints 78 (Fig. 1) and shaft 79 with the power take-off shaft 22 of the tractor.

In the exemplary rake the housing 77 is mounted on a bracket 80 depending from the cross member 64 of the frame. The bracket 80 supports one end of a belt shield 83A, the other end of which is supported on a strap 83B clamped to the forward spindle 70 by a U-bolt 83C. The bracket is rigidly held in an upright position by the brace 81 extending laterally from its lower end to the pin 63A. A V-belt 82 drivingly connects the sheave 75 with a sheave 83 bolted or otherwise securely attached to the arms of the spider 24, as shown in Fig. 4. In the present instance the sheave 83 is of substantially larger diameter than the sheave 75, but it will be understood that the driving ratio of the sheaves is determined by the rotative speed of the power take-off shaft as compared with the forward movement of the tractor. In any case, the driving ratio is so proportioned that the reel 23 is rotated at a speed effective to produce the tooth velocities hereinbefore discussed in detail.

Suitable means is provided for taking up any slack in the belt 82. As herein shown the take-up means comprises a roller 84 journaled on the free end of a bifurcated arm 85 pivotally supported at 86 on the bracket 80. A spring 87 acting on a crank arm 88 rigid with the arm 85 urges the roller against the upper run of the belt. As shown in Fig. 4, one end of the spring 87 is connected to the crank arm 88 and the other end is connected to an eyebolt 89 extending through an aperture in a bracket 90 depending from the frame member 41. Take-up nuts 91 threaded on the bolt provide for its longitudinal adjustment to vary the tension of the spring 87 and thus regulate the pressure of the roller 84 against the belt 82.

As shown in Figs. 1 and 11, strippers 92 extend between the front and rear sides of rake frame 20. Each stripper comprises a central curved portion 92A parallel to the plane of movement of each rake tooth, an end portion 92B extending through the rear side 32 of frame 21 at right angle thereto and secured by nut 92C thereto, and a straight stripper portion proper 92D angled to the plane of rake tooth movement in plane perpendicular to the front side 31 of the frame and terminating in a bent end 92E extending through and secured to the front side of the frame by nut 92F.

In operation, the implement is drawn in a forward direction by the tractor 21 with the reel 23 rotating in timed relation to the forward velocity. As explained heretofore the reel drive means is arranged so as to drive the reel at a speed effective to produce a tooth velocity relative to the ground having a ratio between the limits of 1.5:1 and 1.7:1 with respect to the forward velocity of the implement. Since power for driving the reel is derived from the power take-off of the tractor, these ratios will obtain for any reasonable tractor speed, since the ground speed of the tractor and the rotative speed of the power take-off shaft are both dependent upon engine speed.

In the advance of the rake, the teeth 27 of the several rake bars 26 sweep successive ground areas to gather the hay therefrom. Since six of the rake bars are provided in the improved rake, there is sufficient overlapping of the swept areas to insure the gathering of all hay therefrom. In other words, the teeth of at least two rake bars will be in operative relation to the ground at all times and the mass of hay released by one set of rake teeth will be engaged and advanced by the succeeding set.

As the rake advances, the hay from successive areas swept by the teeth is piled up in a loose fluffy mass increasing gradually in cross-sectional area toward the discharge side of the rake. By reason of the novel angular and velocity relationships provided by the invention, the mass of hay is carried forward by the rake but along a path inclined toward the discharge side thereof at a substantial angle to the line of travel of the rake. As the mass reaches the discharge side of the rake it merely has to turn a corner to enter the windrow without any substantial change in its cross-sectional area, thereby leaving the hay in proper condition for curing and for subsequent handling.

I claim as my invention:

1. In a side-delivery rake having ground-engaging means at its rear providing part of its support in operation and adapted to be connected to a tractor for the balance of its support at its front in operation, a pair of rotatable end members having parallel axes of rotation laterally displaced from one another and disposed at an angle to the line of travel of the rake such that the rotational planes of the end members extend diagonally rearwardly at an obtuse angle relative to the line of travel of the rake, means for drivingly connecting one of said end members to a power source on said tractor, a plurality of rake bars connected to and extending between the end members diagonally rearwardly of the line of travel of the rake in the same direction but at a greater obtuse angle than said planes, each rake bar having depending teeth, and a rigid frame surrounding the rake bars and end members and having front and rear lateral portions generally parallel to the rake bars and end portions supporting the end members and extending between the lateral portions diagonally rearwardly toward the said one side, the front lateral portion of the frame being at a higher level than the rear lateral portion thereof, and the end portions of the frame being inclined.

2. In a side-delivery rake, a pair of rotatable end members having parallel axes of rotation laterally displaced from one another and disposed at an angle to the line of travel of the rake such that the rotational planes of said members extend diagonally rearwardly at an obtuse angle relative to the line of travel of the rake, a plurality of rake bars connected to and extending between the end members diagonally rearwardly of the line of travel in the same direction but at a greater obtuse angle than said planes, each rake bar having depending teeth, a frame surrounding the rake bars and the end members and having forward and rearward lateral portions generally parallel to the rake bars and end portions supporting the end members and extending between the lateral portions, the front lateral portion of the frame being at a higher level than the rear lateral portion, and the end portions being inclined, ground wheels at the rear of the rake, and a structure supporting the rake at the rear partially on the ground wheels and adapted to support the rake at the front partially on a tractor, said structure including laterally spaced members having horizontal intermediate portions crossing and attached to the forward frame portion, depending rear portions connected to the rear frame portion and to the ground wheels, and depending front portions having means for connection with the tractor.

3. In a side-delivery rake, a pair of rotatable end members having parallel axes of rotation laterally displaced from one another and disposed at an angle to the line of travel of the rake such that the rotational planes of said members extend diagonally rearwardly at an obtuse angle relative to the line of travel of the rake, a plurality of rake bars connected to and extending between the end members diagonally rearwardly of the line of travel in the same direction but at a greater obtuse angle than said planes, each rake bar having depending teeth, a frame surrounding the rake bars and the end members and having forward and rearward lateral portions generally parallel to the rake bars and end portions supporting the end members and extending between the lateral portions, all of said portions being disposed in a common plane with the front lateral portion of the frame at a higher level than the rear lateral portion and the end portions inclined, ground wheels at the rear of the rake, and a structure supporting the rake at the rear partially on the ground wheels and adapted to support the rake at the front partially on a tractor, said structure including spaced members crossing and attached to the lateral portions of the frame and connected at the rear to the ground wheels, and means adjacent the front ends of said crossing member for connection with the tractor.

4. In a side delivery rake adapted to be supported at its front on a tractor having a power take-off, the combination of an elongated frame including spaced parallel front and rear members disposed at an angle to the line of travel of the rake and connected at opposite ends by rigid end members, a rake reel comprising a pair of spiders respectively supported for rotation about parallel axes on said end members, a series of rake tooth carrying bars extending between said spiders parallel to said front and rear frame members, means connecting opposite ends of said bars to the respective spiders at points spaced radially from the axes of the spiders whereby the bars are traversed successively in operative relation to the ground upon rotation of the spiders, said connecting means permitting relative rotation between the bars and the spiders about axes parallel to the spider axes whereby the bars are restrained against rotative movements about their own longitudinal axes the axes of said spiders being skewed with respect to the line of travel of the tractor so as to impart a rearward component to the bars in the operative portion of their movement, and drive means connecting one of said spiders with the power take-off of the tractor operative to rotate said reel at a speed effective to cause each rake tooth to traverse a path inclined at an angle of approximately 60° to the line of travel of the rake.

5. In a side delivery rake adapted to be closely coupled with a tractor having a hitch linkage including a lower pair of laterally spaced draft links and an upper compression link, the combination of an elongated frame, a rake reel rotatably supported on said frame, a pair of transverse members rigid with and extending diagonally across said frame, connecting means at the forward end of each member for operative association with one of the draft links of the tractor hitch, said connecting means being spaced from said frame so as to locate the latter in inclined relation to the line of travel of the tractor when associated with the draft links, and connecting means carried by said transverse members for operative association with the compression link of the tractor hitch.

6. In a side delivery rake adapted to be operatively associated with a tractor having a power lift hitch linkage including a lower pair of laterally spaced draft links and an upper compression link swingable between operating and transport positions, the combination of an elongated frame comprising parallel front and rear members connected at opposite ends by end members, a rake reel rotatably supported on the end members of said frame, a pair of transverse members extending across said frame and rigidly secured to said front and rear frame members, ground engaging elements carried by said transverse members at the rear of said frame for supporting a portion of the weight of the implement while being drawn by the tractor in an operative position, and means carried by said transverse members forwardly of said frame for connection with said hitch links whereby the forces involved in drawing the implement in operating position and in swinging it to transport position are applied through the transverse members, said transverse members being adapted to support said rake in a cantilever fashion from said hitch linkage when the rake is in the transport position.

7. In a side delivery rake adapted to be attached to a tractor having a power take-off shaft, the combination with an elongated frame, a rake reel including a series of rake bars carried by a pair of spiders rotatably supported at opposite ends of said frame, means for connecting said frame to the tractor in inclined relation including a pair of transverse members extending diagonally across the frame, a bracket supported adjacent the forward ends of said members, a sheave rotatably supported on said bracket and drivingly coupled with the power take-off shaft of the tractor, said sheave being mounted with its axis disposed at an angle to the axis of the power take-off shaft and substantially parallel to the axis of one of said spiders, a sheave rigid with said one spider, and a driving belt running over said sheaves.

8. In a side delivery rake adapted to be operatively associated with a tractor having a power lift hitch linkage including a lower pair of laterally spaced draft links and an upper compression link swingable vertically between operating and transport positions, the combination of an elongated frame comprising parallel front and rear members and interconnecting end members, a rake reel rotatably supported on the end members of said frame, said frame members being disposed in a common plane inclined from the horizontal with the front member located substantially above the rear member, a pair of transverse members extending across said frame and rigidly secured to said front and rear frame members, ground engaging elements carried by said transverse members at the rear of said frame for supporting a portion of the weight of the implement while being drawn by the tractor in an operative position, the forward end portions of said transverse members extending downwardly from the front frame member and having means located forwardly of said frame for connection with the draft links of the tractor, said transverse members carrying other means located above said draft link connecting means for connection with the tractor compression link.

9. In a side delivery rake adapted to be operatively associated with a tractor having a power lift hitch linkage including a lower pair of laterally spaced draft links and an upper compression link swingable vertically between operating and transport positions, the combination of an elongated rigid frame including front and rear members interconnected by end members, said frame members being disposed in a common plane inclined from the horizontal in a fore and aft direction with the front frame member located above the rear frame member, a pair of inverted substantially U-shaped members extending transversely across said frame respectively connected at their rear ends with the rear frame member and connected at an intermediate point with the front frame member, means adjacent the front ends of said transverse members for connection with the tractor hitch links, and a rake reel rotatably supported on the end members of said frame.

10. In a side delivery rake adapted to be attached to a tractor having a power takeoff shaft and a power lift hitch linkage including a lower pair of laterally spaced draft links and an upper compression link swingable vertically between operating and transport positions, the combination of an elongated frame including generally parallel front and rear members and interconnecting end members, a rake reel including a series of rake bars and a pair of rake bar supporting spiders, means rotatably supporting said spiders on the end members of said frame, means for connecting said frame to the tractor hitch linkage with the frame disposed at an angle to the line of travel of the tractor, said connecting means including a pair of transverse members extending diagonally across the frame and having means at their forward ends for connection with the tractor hitch links, a bracket supported adjacent the forward ends of said transverse members, a sheave rotatably supported on said bracket and drivingly coupled with the power takeoff shaft of the tractor, said shaft being mounted with its axis disposed at an angle to the axis of the power takeoff shaft and substantially parallel to the axis of one of said spiders, a sheave rigid with said one spider, and a driving belt running over said sheaves.

11. In a side delivery rake, the combination of an elongated rigid frame, a rake reel comprising a pair of spiders respectively supported at opposite ends of said frame for rotation about laterally spaced parallel axes, a series of mutually parallel rake tooth carrying bars extending between said spiders, means connecting opposite ends of said bars to the respective spiders at points spaced radially from their rotational axes whereby the bars are traversed successively in operative relation to the ground upon rotation of the spiders, means drivingly connecting one of said spiders to a source of power externally of the rake, the axes of said spiders being skewed with respect to the line of travel of the rake and confining said rake tooth carrying bars to rearward movement relative to the line of travel of the rake during their effective raking stroke whereby the resulting effective travel of the rake teeth exceeds the effective width of the raking swath by not more than ten per cent.

12. In a side delivery rake having a frame adapted to be connected to and supported adjacent its forward end by a tractor, a rake reel supported on said frame and comprising, in combination, a pair of end members supported at opposite sides of said frame for rotation about axes parallel to each other and skewed relative to the fore-and-aft line of draft of the rake such that the rotational planes of the members extend diagonally rearwardly at an obtuse angle relative to the line of draft and toward the discharge side of the rake, a plurality of rake bars extending between and having pivotal connections at opposite ends with the respective end members, said end members being spaced apart fore-and-aft of said frame so that said rake bars extend toward the discharge side of the rake diagonally rearwardly of the line of draft but at a greater obtuse angle than said planes, each of said rake bars having a plurality of rake teeth spaced apart longitudinally thereof and projecting at one side of the bar, said pivotal connections including cooperating pins and sockets disposed in parallel relation with the axes of said end members and preventing rotation of the bars about their longitudinal axes while the bars rotate bodily with the end members about the axes of the latter, and means for driving one of said end members at a uniform rotative speed, said parallel alignment of the pivot and end member axes acting to restrain said bars against rotation about their longitudinal axes.

13. In a side delivery rake, in combination, a rake reel comprising a pair of rotatable end members having parallel axes of rotation displaced laterally and also fore-and-aft of the rake with respect to each other, a plurality of rake bar members each having a series of rake teeth projecting at one side thereof and extending downwardly therefrom, said bar members having at their opposite ends pivotal connections with the respective end members at points spaced uniformly from the rotational axes of the end members and constraining said rake bar members to move bodily in a closed path in the rotation of the end members, said pivotal connections being skewed relative to the longitudinal axes of said rake bar members and thus effective to hold said rake bar members against rotation about their own longitudinal axes, said end members having their rotational axes skewed with respect to the line of draft of the rake and positioning the orbit of said rake bar members so that in the downward movement of each rake bar member the rake teeth thereon receive a rearward component of movement relative to the line of draft, each of said pivotal connections including a pin anchored to one of the members and a socket carried by the companion member for rotatably receiving the pin, said pins and sockets being mounted with their axes parallel to the rotational axes of the end members whereby the rake bar members and the rake teeth thereon are traversed at uniform velocity throughout their entire range of movement.

LESTER G. KOPP.

REFERENCES CITED

The following references are of record in the file of this patent:

UNITED STATES PATENTS

| Number | Name | Date |
|---|---|---|
| 935,456 | Blackstone et al. | Sept. 28, 1909 |
| 1,195,172 | Bamford | Aug. 22, 1916 |
| 1,371,465 | Bowers | Mar. 15, 1921 |
| 2,255,288 | Jones et al. | Sept. 9, 1941 |
| 2,336,117 | Moschel | Dec. 7, 1943 |

FOREIGN PATENTS

| Number | Country | Date |
|---|---|---|
| 405,342 | France | Dec. 27, 1909 |
| 239,235 | Germany | July 17, 1911 |
| 541,610 | Great Britain | Dec. 3, 1941 |